United States Patent

Bowers et al.

[11] Patent Number: 6,154,353
[45] Date of Patent: *Nov. 28, 2000

[54] MAGNETIC SUSPENSION SYSTEM

[75] Inventors: Edward Norman Bowers, Crosby; Ronald Barry Thomas Jones, Ramsey; Nabeel Shirazee, Cardiff, all of United Kingdom

[73] Assignee: Magnetic Patent Holdings Limited, Ramsey, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 09/028,129

[22] Filed: Feb. 23, 1998

Related U.S. Application Data

[63] Continuation-in-part of application No. PCT/GB96/02150, Sep. 2, 1996.

[30] Foreign Application Priority Data

| Sep. 2, 1995 | [GB] | United Kingdom | 9517911 |
| Mar. 21, 1996 | [GB] | United Kingdom | 9605925 |
| May 24, 1996 | [GB] | United Kingdom | 9610927 |
| Jun. 21, 1996 | [GB] | United Kingdom | 9613061 |

[51] Int. Cl.$^7$ .................................................. H01H 47/00
[52] U.S. Cl. .......................... 361/144; 361/143; 361/147
[58] Field of Search .................. 361/139, 143, 361/144, 145, 146, 147; 335/289, 290, 291, 295; 310/90.5

[56] References Cited

U.S. PATENT DOCUMENTS

| 2,946,930 | 7/1960 | Gilbert . | |
| 3,112,962 | 12/1963 | Lautzenhiser . | |
| 3,849,724 | 11/1974 | Ghibu et al. | 324/34 D |
| 4,316,394 | 2/1982 | Dohogue | 74/5.46 |
| 4,555,120 | 11/1985 | Frait et al. | 280/6.1 |
| 4,585,282 | 4/1986 | Bosley | 308/10 |
| 4,910,633 | 3/1990 | Quinn | 361/139 |
| 4,943,772 | 7/1990 | Maupu et al. | 324/207.2 |
| 5,003,211 | 3/1991 | Groom | 310/90.5 |
| 5,003,235 | 3/1991 | Groom | 318/135 |
| 5,155,651 | 10/1992 | Yoda et al. | 361/144 |
| 5,267,091 | 11/1993 | Chen | 359/872 |
| 5,311,124 | 5/1994 | Hubbard et al. | 324/207.13 |
| 5,332,987 | 7/1994 | Hennessy et al. | 361/144 |
| 5,369,361 | 11/1994 | Wada | 324/207.2 |
| 5,467,244 | 11/1995 | Jayawant et al. | 361/144 |
| 5,602,711 | 2/1997 | Curtis et al. | 361/139 |

FOREIGN PATENT DOCUMENTS

| 0193664 | 9/1986 | European Pat. Off. . |
| 0473231 | 3/1992 | European Pat. Off. . |
| 2586462 | 2/1987 | France . |
| 4210741 | 10/1993 | Germany . |
| 2107085 | 4/1983 | United Kingdom . |

*Primary Examiner*—Fritz Fleming
*Attorney, Agent, or Firm*—Edwin D. Schindler

[57] ABSTRACT

A suspension system for magnetically suspending an object O comprises an electromagnetic coil L having an axially extending core 13 of magnetically permeable material and a permanent magnet 14 disposed on its axis. A permanent magnet 10 is also provided in the object O and is arranged such that it is in attraction with the permanent magnet 14 on the coil L, and with the magnetically permeable core 13 so that the object O is suspended at a position below the coil L by the attractive force. Sensors 15,16 on the coil L detect the magnetic field of the permanent magnet 10 in the object O, and provide signals to a control circuit, which applies current to the coil L to attract the object O when the detected field is below a predetermined limit and to repel the object when the detector field is above a predetermined limit. In this manner, the object O is held in position using a relatively low current, since the coil L is only energised when the object moves away from the position in which it is held by the field of the permanent magnets 10,14.

19 Claims, 7 Drawing Sheets

MAGNETIC SUSPENSION SYSTEM

CROSS REFERENCE TO RELATED APPLICATION

This application is a continuation-in-part of International Patent Application PCT/GB96/02150, filed Sep. 2nd 1996.

BACKGROUND OF THE INVENTION

1. Field of the Invention

This invention relates to a system for the magnetic suspension of objects.

2. Description of the Prior Art

DE-42-10-741 (Fremerey) discloses a magnetic suspension system comprising an electromagnet and a first permanent magnet mounted to a fixed or movable support structure, an object provided with a second permanent magnet and arranged for suspension at a position below the electromagnet, by an attractive force developed between the two permanent magnets, detector means mounted in a fixed position to detect the magnetic field of the second permanent magnet, and control means for supplying an electrical current to the electromagnet when the magnetic field detected by the detector means changes from the field which is detected when the object is at the predetermined position, the electrical current being varied in accordance with an output signal of the detector means to maintain said object in a predetermined position relative to the electromagnet.

A disadvantage of the Fremerey system is that it uses a considerable amount of current to suspend the object at the predetermined position. Furthermore, the suspended object will be irrecoverably pulled into contact with the support structure by the attractive force between the permanent magnets, when the object moves too close to the support structure.

SUMMARY OF THE INVENTION

We have now devised a magnetic suspension system in which the object is substantially suspended at the predetermined position by the attractive force developed between the two permanent magnets and in which the control means is arranged to supply current to the electromagnet in a direction which develops a magnetic field which reduces the attractive force between the object and the support structure, so as move the object away from the support structure when the magnetic field detected by the detector means is above a predetermined limit.

We have found that this system will suspend an object at a controlled position relative to the fixed or movable structure, with a large air-gap between the object and the electromagnet.

The system thus uses very little current because the electromagnet is only energised when the position of the object departs from the position at which it is substantially suspended by the permanent magnetic field developed between the object and the support structure.

When the suspended object moves too close to the support structure, it is repelled by the field developed by the electromagnet, so that the object is not irrecoverably drawn towards the support structure.

The support structure is preferably further provided with a body of magnetically permeable material, so that the object is also partially suspended by an attractive magnetic field developed between its permanent magnet and the body of magnetically permeable material on the support structure.

Preferably the current to the electromagnet is pulse width modulated.

Preferably the control means is arranged to supply current to the electromagnet in a direction which develops a magnetic field which increases said attractive force between the object and the support structure, so as move the object towards the support structure when the magnetic field detected by the detector means is below a predetermined limit.

Preferably the control means is arranged to maintain the object at a position at which current is supplied to the electromagnet in a direction which reduces said attractive force between the two permanent magnets, so that in the event of a power failure the object is attracted towards the support structure by the permanent magnetic field.

Preferably the control means comprises first and a second switches and third and fourth switches, the two respective pairs of switches being connected in series across a d.c. supply, opposite ends of the coil being connected to connection points between the first and second switches and third and fourth switches respectively, and the control means being arranged to actuate said first and fourth switches or said second and third switches depending on the desired direction of current flow through the coil.

It is particularly desirable for the magnetic field detector means to be very sensitive. Preferably this detector means comprises one or more Hall effect sensors: for example, there may be two Hall effect sensors mounted at opposed positions either side of the axis of the electromagnet, the outputs of the two Hall effect sensors being combined (e.g. summed together or averaged) to provide the output signal which is applied to the control means for the electromagnet. Alternatively the detector means may comprise an amorphous ribbon sensor.

Preferably the detector means is magnetically shielded from the magnetic fields generated by the electromagnet and permanent magnet in the support structure. Preferably the detector means is shielded by a non-magnetic material, such as aluminium, which blocks changing magnetic fields, but which does not block steady magnetic fields. Preferably the detector means is shielded by a magnetically permeable material, such as mumetal, which blocks steady magnetic fields, but which does not readily block changing magnetic fields.

Preferably the object being suspended includes a body of magnetically permeable material to which its permanent magnet is mounted, to act as a flux concentrator and to project the field generated by its permanent magnet further towards the support structure.

Preferably the support structure includes a body of magnetically permeable material to which its permanent magnet is mounted, to act as a flux concentrator and to project the field generated by that permanent magnet further towards the object being suspended.

Preferably the electromagnet includes a core of magnetically permeable material.

Preferably the magnetically permeable material comprises mild steel, silicon iron (SiFe), ferro cobolt (FeCo), permendur, or a composition of nickel iron.

Preferably the permanent magnets are formed from a rare earth material such as neodymium iron boron (NdFeB), or other high energy material.

For the electromagnet coil, it is desirable to use very fine (small diameter) wire in order to increase the number of turns which can be wound on a bobbin of predetermined size (and so increase the strength of magnetic field which can be produced using the same drive current), or alternatively reduce the size of the coil. However, reducing the diameter of the wire substantially increases its resistance and hence the drive voltage required to pass the same current through the coil.

Preferably therefore, the electromagnet used in the suspension system of the present invention comprises two or more wires which are wound around a common axis and connected in parallel. The wires may be wound to form respective coils disposed end-to-end, or they may be wound together to form a composite coil extending the length of the electromagnet.

With these coil arrangements, each wire is shorter in length (and therefore of lower resistance value) than a coil of comparable size wound from a single wire. Therefore finer wire can be used without the need to increase the drive voltage in order to maintain a comparable current.

Preferably the object is arranged to rotate about a vertical axis, so that different sides of the object can be seen as it rotates.

Preferably the overall magnetic force developed between the object and the support structure varies as the object rotates about said axis.

Preferably the magnetic field radiated by the object and/or the support structure is non-uniform around a circle which is disposed co-axially with said axis of rotation.

Preferably, the support structure and the object each comprise a magnet or a magnetic member disposed at a point radially outwardly of said axis of rotation, so that the magnetic force developed between the object and the support structure varies according to the alignment of the magnet or magnetic member on the object with the magnet or magnetic member on the support structure.

Preferably the magnetic member on the object and/or support structure becomes magnetised by an adjacent magnetic field.

Preferably the magnet or magnetic member on the support structure is arranged to repel the magnet or magnetic member on the object.

Preferably the detector means is mounted in a fixed position to the support structure, at a position which is located radially outwardly of said axis of rotation.

In use, as the object rotates, the non-uniform field created by the magnet or magnetic member thereon aligns with the detector on every revolution. This change in the incident magnetic field on the detector fools the control means into thinking that the object has moved away from the predetermined position at which it is being held. Accordingly, the control means applies a corresponding current to the electromagnet in an attempt to correct the position of the object. It is believed that this change in current on every revolution could have an effect on the magnetic field radiated by the object, thereby causing the object to rotate.

BRIEF DESCRIPTION OF THE DRAWINGS

Embodiments of this invention will now be described by way of examples only and with reference to the accompanying drawings, in which.

DESCRIPTION OF THE EMBODIMENT SHOWN IN THE DRAWINGS

Figure 1:
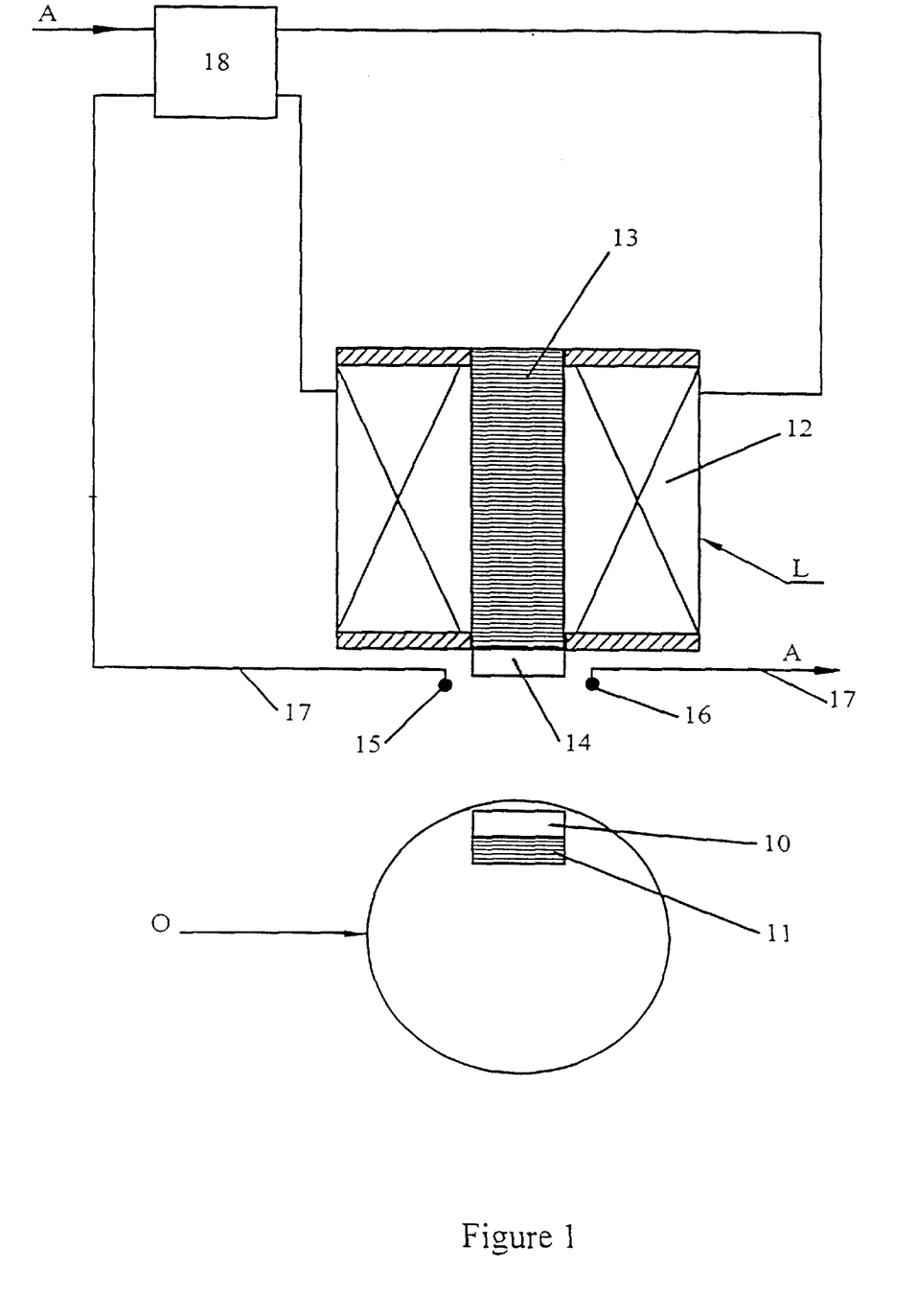
FIG. 1 is a schematic diagram of a first embodiment of magnetic suspension system in accordance with this invention.

Referring to FIG. 1 of the drawings, there is shown a magnetic suspension system for suspending an object O at a controlled position relative to a fixed structure. The object O is provided with a rare earth permanent magnet 10 mounted to a piece of mild steel 11 which acts as a flux concentrator. An electromagnet 12 is mounted to the fixed structure. In use the object O is magnetically suspended below the electromagnet 12, which comprises a coil L wound on a bobbin: in the example shown the coil L has its axis vertical, but it may be inclined to the horizontal or even be close to the horizontal. The electromagnet 12 has a core 13 of mild steel or other magnetically permeable material, and may rest on a panel having a central aperture aligned with the core of the electromagnet. Further, a second rare earth permanent magnet 14 is mounted to the bottom end of the core 13, to attract the permanent magnet 10 of the object O. The core 13 may be made in two parts with the magnet 14 positioned between them, such that the magnet 14 is disposed at a selected position along the axis of the core. Instead the core may have a hollow passage in it, so that the axial position of the magnet 14 may be selected or adjusted. Two Hall effect sensors 15,16 are mounted below the electromagnet 12, such that they are substantially shielded from its magnetic field.

Wires 17 connect the Hall effect sensors 15,16 to respective inputs of a control circuit 18, the coil L being connected across the outputs of the control circuit 18.

Figure 2:
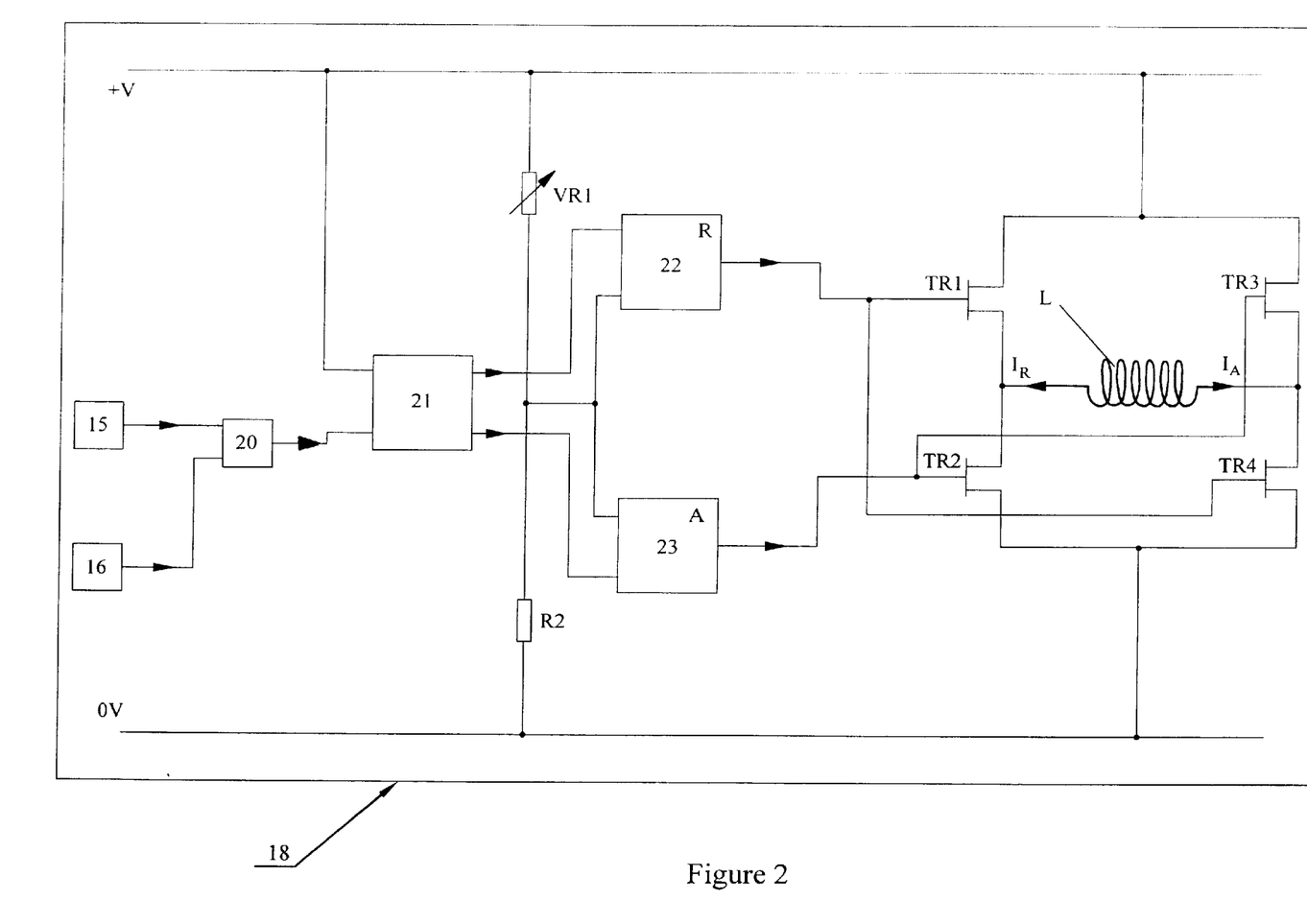
FIG. 2 is a block diagram of a control circuit of the magnetic suspension system of FIG. 1.

Referring to FIG. 2 of the drawings, inside the control circuit 18 the outputs of the Hall sensors 15,16 are connected to a summing or averaging circuit 20. The output of the summing or averaging circuit 20 is connected to a comparator 21 or error amplifier which compares the summed or averaged signal from the Hall sensors 15,16 with a reference level, which is set by adjusting an adjustable resistor VR1 that is connected in series with a resistor R2 across a d.c. supply. The comparator 21 has two outputs which are connected to respective pulse width modulators 22,23. Two pairs of series-connected insulated gate bi-polar transistors (IGBTs) TR1,TR2 and TR3,TR4 are connected in parallel across the d.c. supply. One end of the coil L is connected to the interconnection point between transistors TR1 and TR2 and the other end of the coil is connected to the interconnection point between transistors TR3 and TR4. The gate of transistor TR1 is connected to the gate of transistor TR4 and also to the output of one of the pulse width modulators 22. Similarly, the gate of transistor TR2 is connected to the gate of transistor TR3 and to the output of the other pulse width modulator 23.

Referring again to FIG. 1 of the drawings, the permanent magnet 10 of the object O and the permanent magnet 14 of the coil L are arranged such that they attract each other, the permanent magnet on the object O also being attracted to the steel core 13 of the electromagnet. If the object O has a weight which is less than the maximum attractive force between the magnets 10,14, then it will be appreciated that the spacing between the magnets can be adjusted, so that at one point the gravitational force on the object exactly equals the attractive force between the magnets 10,14: at this so-called balancing point the object will float in mid air. The balancing point is finite, and in practice it is difficult to get the object to float without some form of control.

Figure 3:
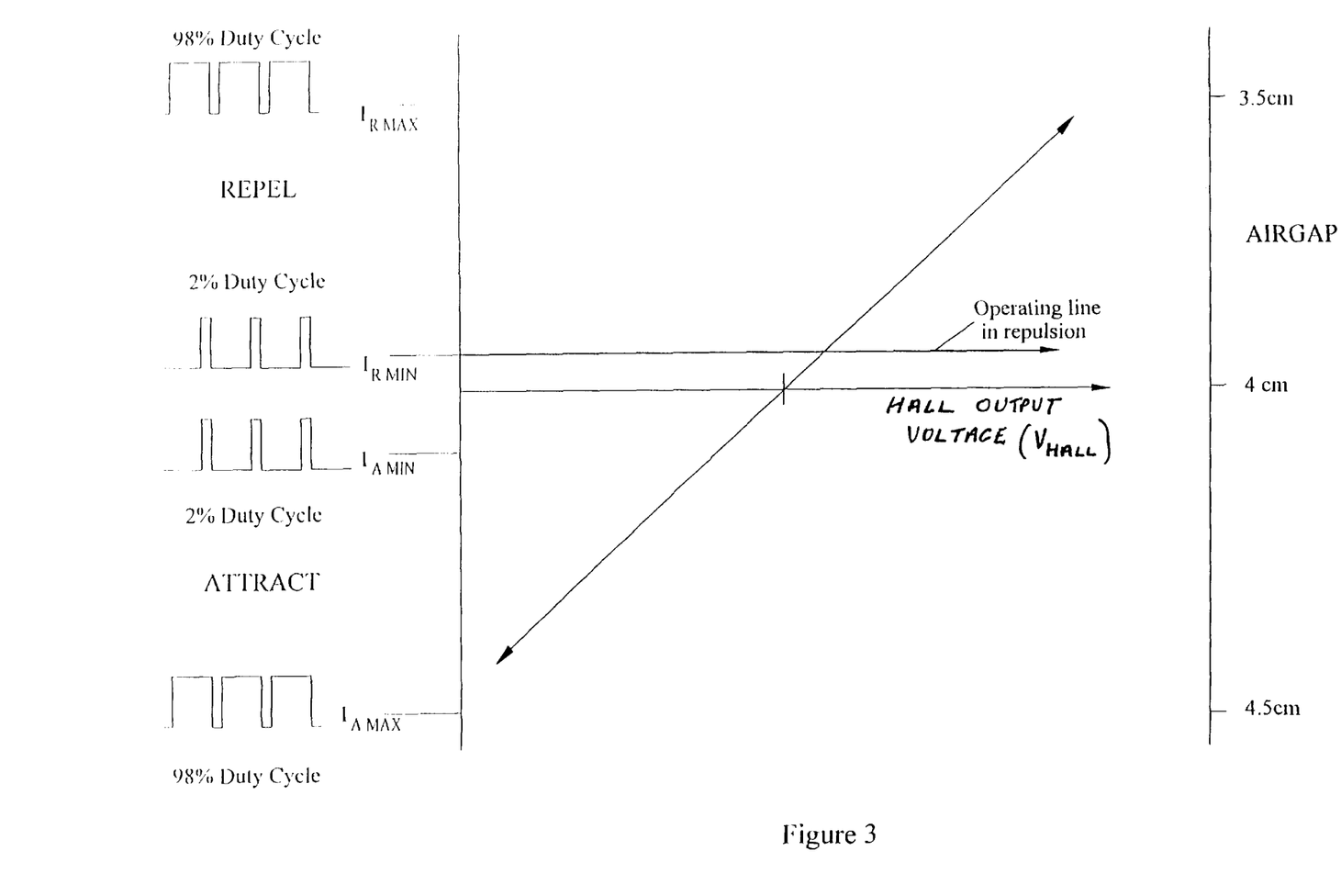
FIG. 3 is a graph of coil current against Hall sensor output for the circuit of FIG. 2.

Referring to FIG. 3 of the drawings, it will be appreciated that the magnetic field at the sensors 15,16 will vary depending upon the proximity of the magnet 10 of the object O. This magnetic field is sensed by the sensors 15,16, which output a corresponding signal $V_{HALL}$ to the control circuit 18. The comparator circuit 21 in the control circuit compares the combined output from the Hall sensors 15,16 with a reference set by adjustable resistor VR1. If the Hall sensor output is above the reference then a signal representing the magnitude of the difference is output to the pulse width modulator circuit 22, whereas if the output is below the reference then a signal representing the magnitude of the difference is output to the other pulse width modulator 23.

Each of the pulse width modulators 22,23 is arranged to output a square wave whose mark-space ratio depends on the magnitude of the respective signal from the comparator circuit 21. If the signal from the comparator circuit 21 is small, then the mark-space ratio will be as low as 1:49 (2% ON), whereas if the signal is high then the mark-space ratio will be as high as 49:1 (98% ON). When the output of one of the pulse width modulators e.g. 22 is high, the transistors TR1 and TR4 will be turned on, so that current $I_R$ flows through the coil L. Likewise, when the output of the other pulse width modulator 23 is high, transistors TR2 and TR3 will be turned on and current $I_A$ will flow in the reverse direction through the coil L.

Assuming that the weight of the object and the strength of the permanent magnets 10,14 are such that the above-mentioned balancing point occurs at a spacing of 4 cm, then adjustable resistor VR1 is adjusted so that no current $I_A,I_R$ flows through the coil L at this point: in practice adjustable resistor VR1 sets a small range of reference points between which no current flows, in order to avoid cycling of the current through coil L. If the object O moves away from the coil, the magnetic field $F_{MAG}$ at the Hall sensors 15,16 will decrease and the input signal to the comparator 21 will drop below the reference level, thereby causing the pulse width modulator 23 to operate, so that current $I_A$ flows through the coil L. When current $I_A$ flows, the electromagnetic field generated by the coil L supplements the magnetic field between the permanent magnets 10,14 and attracts the object O back towards the coil L. The magnitude of the coil current $I_A$, and hence the strength of the magnetic field generated, will depend on how far the object O has moved away from the coil L.

If the object O is pulled closer to the coil than the balancing point, then the control circuit 18 operates so that the reverse current $I_R$ flows through the coil L. This reverse current $I_R$ causes a magnetic field which repels the magnet 10, so that the object moves away from the coil L.

It will be appreciated that very little current flows through the coil L, since the coil is only energised when the position of the object O departs from the balancing point. In this manner, the system in accordance with this invention can be powered by a small, low voltage d.c. battery, which will last for a considerable amount of time before it becomes exhausted. Alternatively, the circuit could be powered from the mains via a low voltage d.c. supply.

If there is a power cut or if the battery becomes exhausted, then it will be appreciated that the object O may drop to the floor, which could be undesirable. Thus, in an alternative embodiment, adjustable resistor VR1 is set so that the object is held at a position in which the minimum repulsion current $I_A$ flows, thereby producing a repelling force, which keeps the object away from the coil L. This repelling force will cease if there is a loss of power to the coil and the object O will be attracted towards the coil, where it will be held by the attractive force between the permanent magnets 10,14.

We have found that, in use of the suspension system which has been described, the object O can be suspended in a stable position with a large air-gap (up to 60 mm). The object is substantially suspended by the attraction force between the permanent magnets 10,14, and thus only a small current (of 10 mA) is required for the electromagnet, with a correspondingly low power consumption when the object is at the balancing point. However, when the object departs from the balancing point the current increases exponentially with distance, so that the object is quickly brought back into position. The maximum current flow through the coil could be as high as 700 mA.

Figure 4:
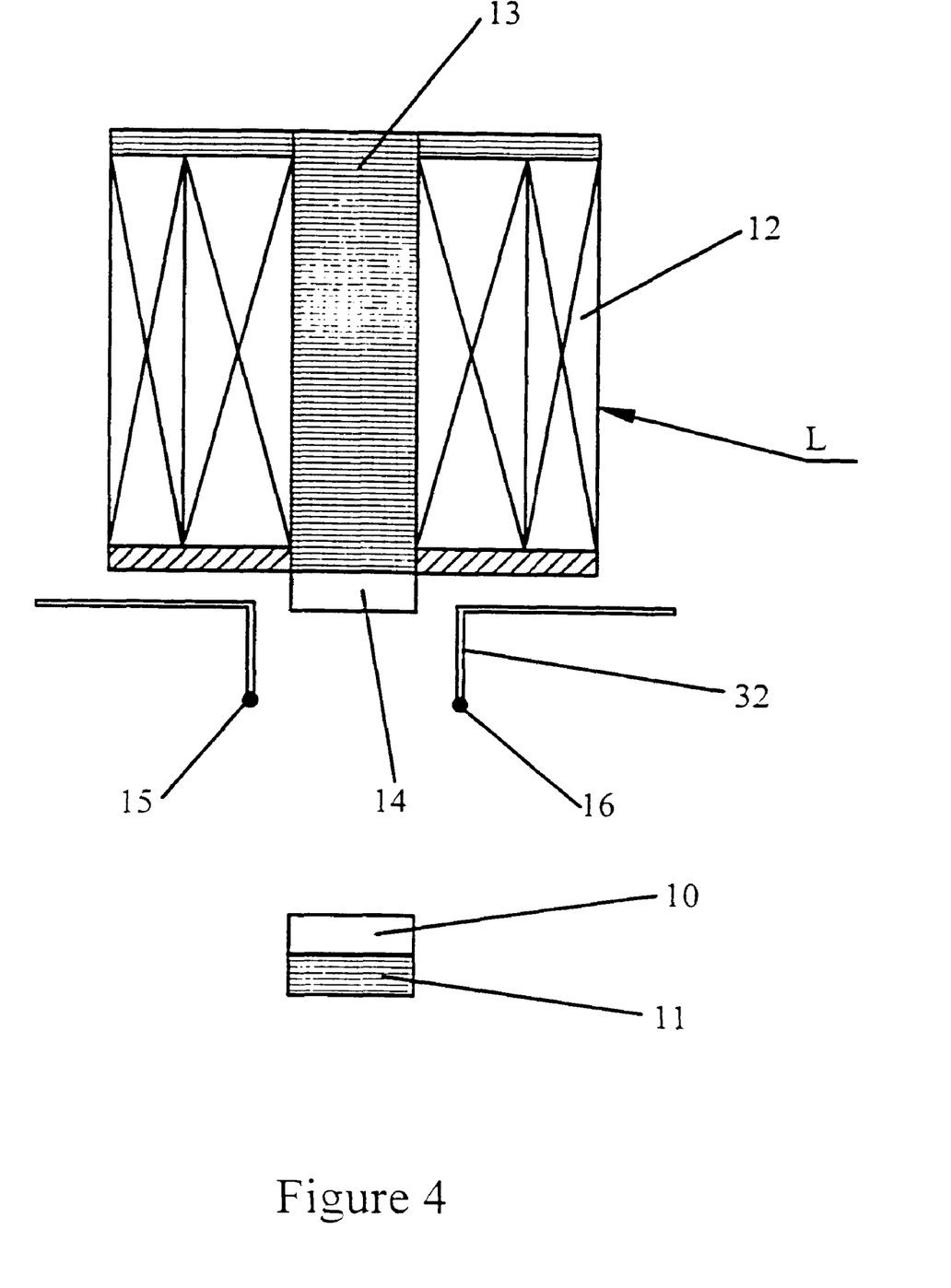
FIG. 4 is a schematic diagram of a second embodiment of magnetic suspension system in accordance with this invention.

In the embodiment shown in FIG. 4, the Hall effect sensors 15,16 are mounted at the lower end of a projection 32 (e.g. a tubular sleeve) from an apertured panel on which the electromagnet rests. This arrangement enables the object O to be suspended at a larger air-gap (up to 80 or 90 mm) below the electromagnet, since it is the sensitivity of the sensors which limits the size of the air-gap and not always the strength of the permanent magnets 10,14.

Figure 5:
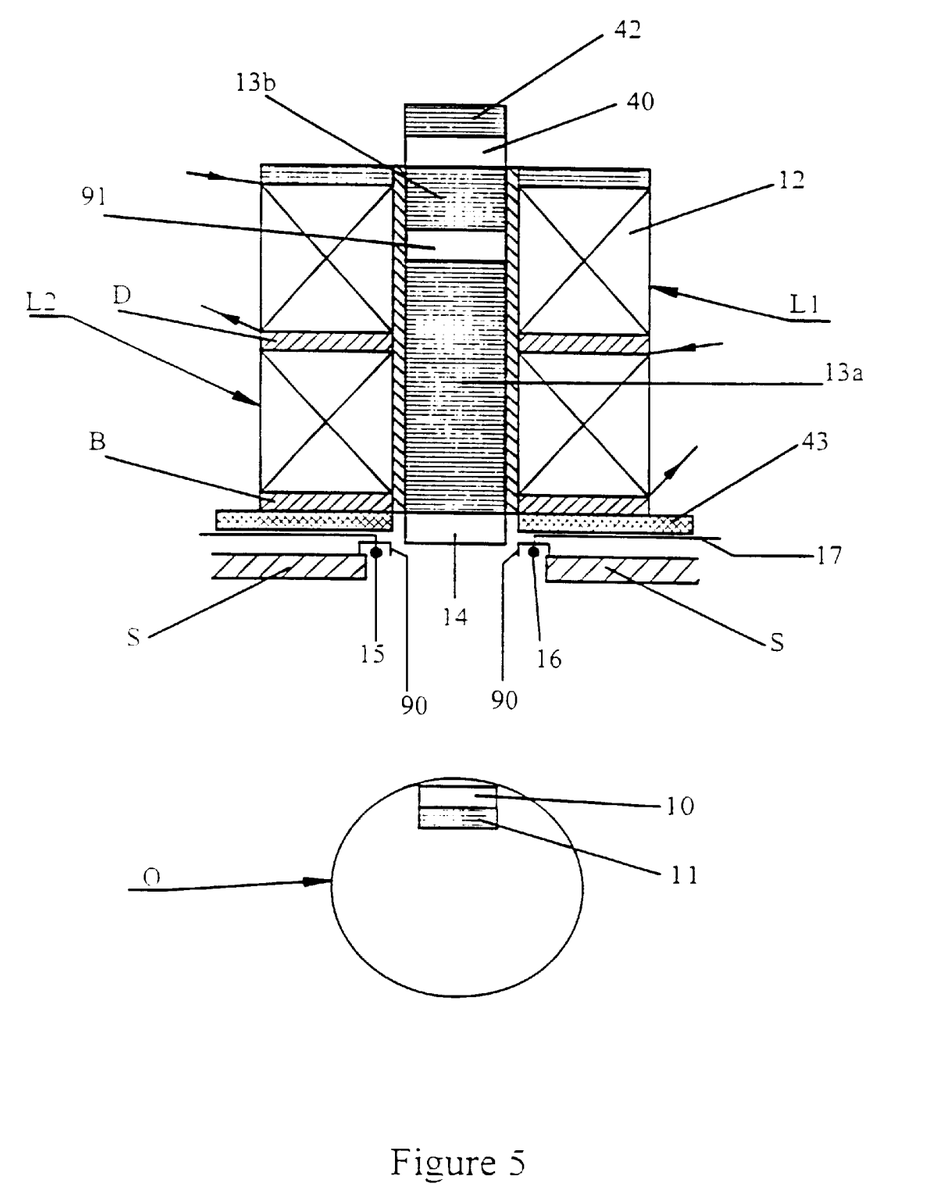
FIG. 5 is a schematic diagram of a third embodiment of magnetic suspension system in accordance with this invention.

Referring to FIG. 5 of the drawings, there is shown a further embodiment of suspension system, and like parts are given like reference numerals. In this embodiment, two rare earth permanent magnets 14,40 are mounted at opposite ends of the coil L on its vertical axis. A third permanent magnet 91 is mounted inside the core of the coil between two steel core sections 13a, 13b. The position of the magnet 91 on the core may be adjusted during manufacture in order to set the balancing point. The magnets 14,40,91 are arranged with their respective like poles directed in the same direction along the axis of the coil L. A piece of silicon iron 42 is mounted on top of the upper rare earth magnet 40. The lower rare earth magnet 14 extends through a central aperture in an aluminium disc 43 which is mounted below the coil L. The Hall effect sensors 15,16 are mounted on the underside of the aluminium disc 43 in downwardly facing cups 90 of mumetal.

The permanent magnet 10 of the object O being suspended is attracted towards the mass of magnetically permeable material and the two magnets 40,41 in the support structure S, the permanent magnet 10 being mounted on a piece of silicon iron 11.

In use, the suspended object 10 is attracted towards the support structure S from a distance of up to 60 mm, although this depends on the strength of the magnets and the weight of the object O.

The mumetal cups 90 help to shield the Hall sensors 15,16 from the steady magnetic field generated by the coil L, and the aluminium disc 43 helps to shield the Hall sensors from varying magnetic fields generated by the coil. It will be appreciated that the magnetic field generated by the coil L and the permanent magnets 40,41,91 thereon extends solely through the aperture in the disc 43, and is thus concentrated vertically downwardly. The silicon iron piece 42 on top of the upper permanent magnet 40 helps to confine the magnetic field to the downwards direction.

If it is desired to support a heavier object or increase the air-gap, then the control circuit can be configured so that the coil L attracts the magnet 10 of the object O being suspended and thereby supplements the field of the two magnets 40,41 in the support structure S. The amount of current drawn by the coil L will depend on the size of the desired air-gap, but generally this is adjusted so that the object is suspended substantially by the attraction force between the permanent magnets 10,40,41,91.

Figure 6:
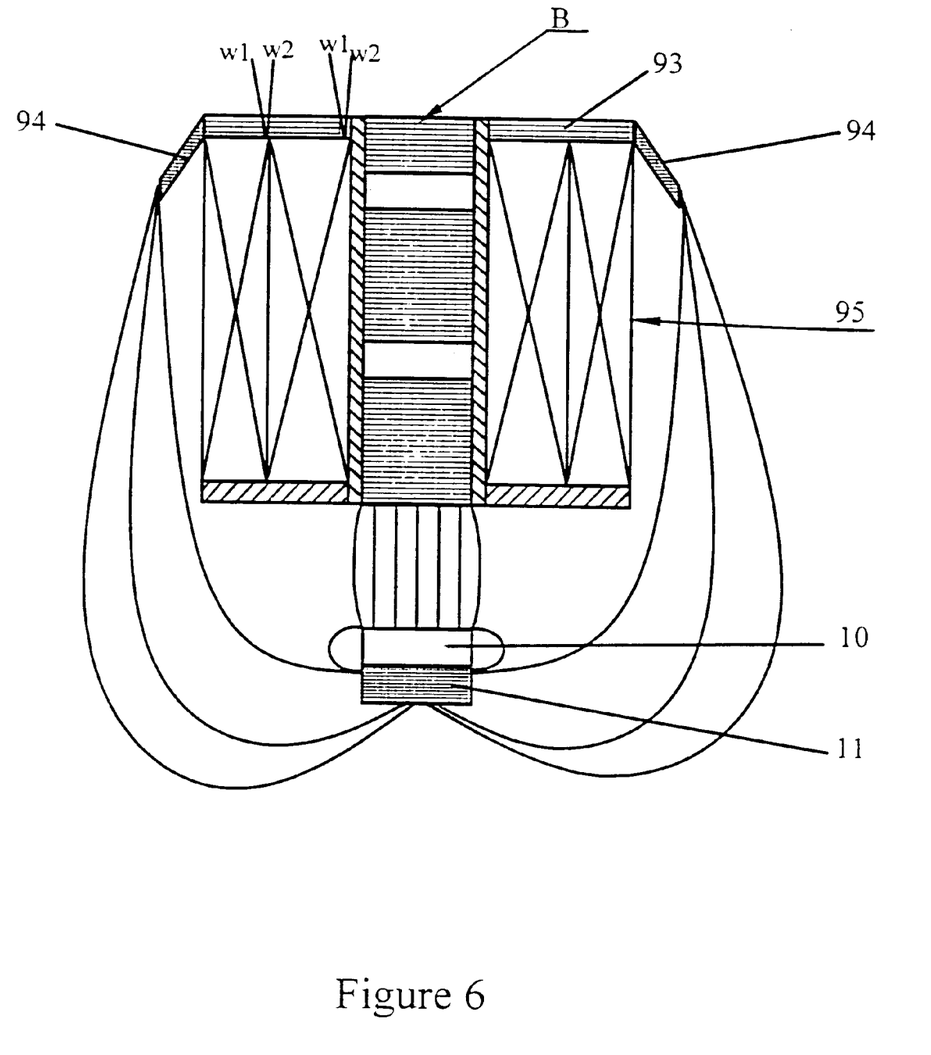
FIG. 6 is a schematic diagram of a fourth embodiment of magnetic suspension system in accordance with this invention.

In order to provide a stronger magnetic field without increasing the voltage needed, or alternatively to enable the electromagnet to be made of a smaller size yet provide the same strength of magnetic field, the electromagnet shown in Figures comprises two coils L1 and L2 wound around respective portions of a bobbin B and separated by a spacer disc D: the coils L1, L2 are connected in parallel to the driving power source. The arrangement allows the use of very fine (small diameter) wire for the coils, without the resistance of each coil becoming excessive, because each coil is relatively short. It will be appreciated that the electromagnet may comprise two or more coils wound on different portions of the bobbin and all connected in parallel: alternatively, two or more wires e.g. W1, W2 may be wound together around the bobbin, as shown in FIG. 6, to form a composite coil extending the length of the bobbin, but again with the respective wires connected in parallel. In a further embodiment, two coils may be co-wound on the bobbin B.

The object being suspended may comprise an annular or spherical magnet which is radially magnetised, so that the object can freely rotate or spin in the magnetic field.

One or more bores may extend axially through the core of the coil, with each sensor being located axially below a respective bore. This arrangement has the advantage that little or no magnetic flux is present in line with the axis of the bore, so that there is less requirement to magnetically shield the sensors. Preferably a bore extends along the axis of the coil through the core, so that a single, centrally located sensor can be used.

As shown in FIG. 6, the uppermost part 93 of the bobbin B may be formed of a magnetically permeable material, such as steel, in order to direct the flux at the upper end of the electropermanent magnet assembly 95 radially outwardly, so that it is more concentrated in the downwards direction to link up with the lines of flux flowing from the underside of the permanent magnet 10 in the object being suspended. Preferably the axially upper end of the coil comprises extensions 94 which are directed substantially axially of the coil in order to direct the flux flowing from the upper end of the electropermanent magnet assembly 95 towards the magnet 10 in the object.

Figure 7:
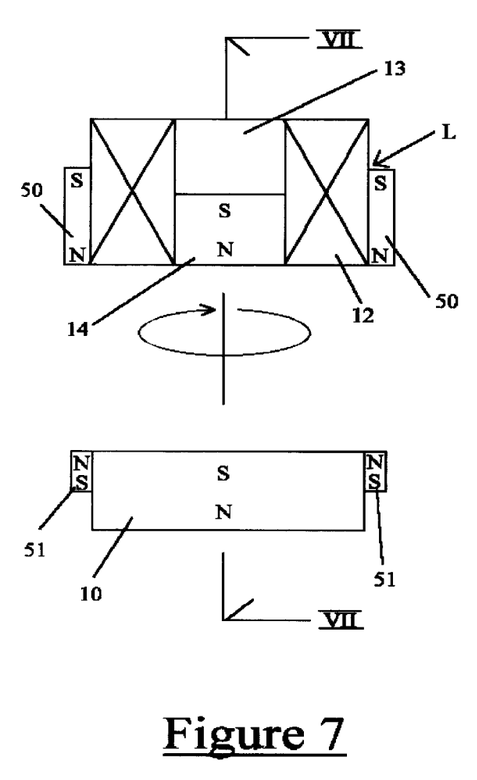
FIG. 7 is a sectional view through a fifth embodiment of magnetic suspension system in accordance with this invention.
Figure 8:
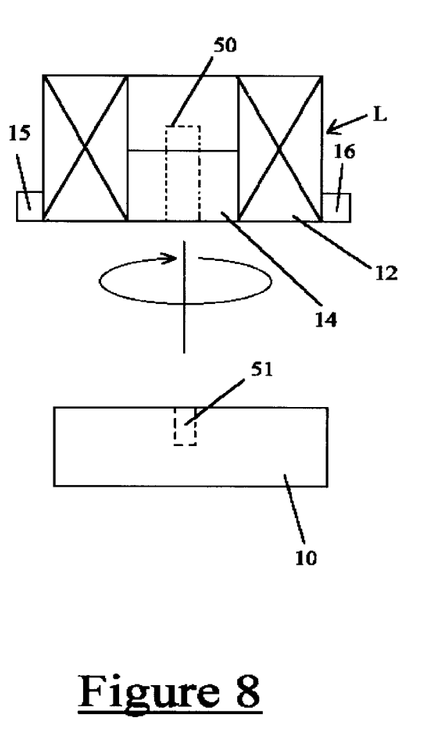
FIG. 8 is a sectional view along the line VIII—VIII of FIG. 7.

Referring to FIGS. 7 and 8 of the drawings, there is shown an alternative embodiment of the invention and like parts are given like reference numerals.

The permanent magnet 10 in the object is preferably cylindrical with its North and South poles being disposed on its respective opposite end faces.

In use, the South pole of the permanent magnet 10 in the object is attracted to the North pole of the permanent magnet 14 in the support structure, as previously described and thus the magnet 10 adopts a position below the support structure, in which its axis co-extends with the vertical axis of the coil L of the electromagnet 12.

Two smaller permanent magnets 51 are attached to the side wall of the cylindrical permanent magnet 10 in the object, the two magnets 51 being disposed at respective points, which are substantially diametrically opposite each other. The permanent magnets 51 are arranged with their North poles facing in the same direction as the South pole of the magnet 10 to which they are attached.

Two elongate iron or steel bars 50 are mounted axially along the outside of the coil L of the electromagnet 12, the bars 50 also being disposed at points which are substantially diametrically opposite each other.

The position of the bars 51 preferably do not coincide with the position of the Hall sensors 15,16, as shown in FIG. 8.

The bars 51 become magnetised by the permanent magnet 14 disposed inside the coil L of the electromagnet 12. Thus, the lower end of the bars 51 are of the same pole type as the lower end of the permanent magnet 14.

We have found that an arrangement as hereinbefore described with reference to FIGS. 7 and 8 can enable the object to rotate about a vertical axis extending along the axis of the coil L and through the axis of the permanent magnet 10, although the exact reason for this is unclear.

The uppermost poles of the two side magnets 51 in the object are of the same type as those which are induced in the lower ends of the bars 50. The two magnets 51 only align directly below the iron bars 50 in two rotary positions of the object, and in this position the bars 50 and magnets 51 try to repel each other, thereby producing a small force which detracts from the overall attractive force between the permanent magnets 10,14. It will be appreciated, that this repulsive force causes the object to rotate away from the position in which the magnets 51 are aligned with the bars 51 and indeed the object can be set to remain in a stable position, in which its two magnets 51 lie midway between the bars 51 on the support structure.

If a small rotational force is applied to the object, each magnet 51 passes under each iron bar 50 once every revolution. The magnets 51 also pass under the Hall sensors 15,16, which are disposed at diametrically opposite positions that are angularly offset from the positions of the bars 50.

The North poles of the magnets 51 cause a weakening in the overall magnetic field radiated by the magnet 10 at their respective positions. Thus, the magnetic field sensed by the two Hall sensors 15,16 will be at a minimum when the magnets 51 are aligned directly underneath the sensors. This reduction in the magnetic field fools the control circuit into believing that the object has moved away from the support structure, thereby causing a change in the current to the coil L, which pulls the object back towards the support structure from its apparent position. The continued rotation of the object means that the magnets 51 soon move out of alignment with the Hall sensors 15,16, whereupon the control circuit senses that the object is now too close to the support structure and thereby generates a current to restore the position of the object.

It is believed that this slight up and down movement of the object could contribute to the rotational force that is applied to the object, particularly when combined with the repulsive force that tends to move the magnets 51 out of alignment with the bars 50.

Alternatively, it is believed that the periodic variation of the magnetic field radiated by the coil L could induce a rotational force on the magnet in the object by means of the so-called motor effect.

In any event, it has been observed that once a sufficient rotational force has been applied to the object for its magnets 51 to pass under the iron bars 50, the object will continue to rotate at a speed which slowly increases up to a maximum value.

The magnetic suspension systems which have been described may be used in a wide variety of applications. For example, the system can be used in advertising, to suspend signs or other objects for display: it will be appreciated that while freely suspended in air, the object may rotate. Further, the system may be used when painting and then drying objects, allowing free access to all sides of the object. Also, the system may be used for the immersion of objects in acid or other solution for chemical treatment; complete immersion may be achieved without any side of the object having to be physically held. Yet further, the system can be used to suspend models of aeroplanes in wind tunnels, giving a better simulation of the real aircraft in flight.

What is claimed is:

1. A magnetic suspension system, comprising:
   a fixed or movable support structure;
   an electromagnet and a first permanent magnet mounted to said support structure;
   an object arranged for suspension below said electromagnet, said object being provided with a second permanent magnet;
   detector means mounted in a fixed position for detecting a magnet field of said second permanent magnet; and,
   control means for supplying an electrical current to said electromagnet in accordance with an output signal of said detector means, wherein said control means is normally arranged for supplying current to said electromagnet in a first direction for maintaining said object at a suspended position in which an upwards force on said object, developed by an attractive force between said first permanent magnet and said second permanent magnet, is equal and opposite to the sum of a prevailing downwards force of gravity plus a substantially smaller downwards force, developed by a repulsive force between said electromagnet and said second permanent magnet, said control means being arranged so that when a magnetic field detected by said detector means is above a predetermined limit, a higher current is supplied to said electromagnet in said first direction for developing a greater repulsive force between said electromagnet and said second permanent magnet which creates a net downward force on said object, so as to move said object away from said support structure, said control means further being arranged so that when the magnetic field detected by said detector means is below a predetermined limit, a current is supplied to said electromagnet in a second direction for developing an attractive force between said electromagnet and said second permanent magnet, thereby creating a net upwards force on said object, so as to move said object towards said support structure.

2. A magnetic suspension system as claimed in claim 1, in which a body of magnetically permeable material is provided on the support structure.

3. A magnetic suspension system as claimed in claim 2, in which the body of magnetically permeable material comprises a core which extends axially of a coil of the electromagnet.

4. A magnetic suspension system as claimed in claim 3, in which the first permanent magnet is disposed axially of the coil.

5. A magnetic suspension system as claimed in claim 3, in which the body of magnetically permeable material comprises a flux concentrator disposed at the axially upper end of the core.

6. A magnetic suspension system as claimed in claim 5, in which the flux concentrator extends over the axially upper end of the electromagnet.

7. A magnetic suspension system as claimed in claim 6, in which the flux concentrator comprises an extension which is arranged to direct magnetic flux at the upper end of the electromagnet downwardly towards the object being suspended.

8. A magnetic suspension system as claimed in claim 1, in which the control means comprises first and second switches connected in series across a d.c. supply and third and fourth switches connected in series across the d.c. supply, opposite ends of a coil of the electromagnet being connected to points between the first and second switches and the third and fourth switches respectively and the control means being arranged to actuate said first and fourth switches or said second and third switches depending on the desired direction of current flow through the coil.

9. A magnetic suspension system as claimed in claim 1, in which the current is pulse width modulated.

10. A magnetic suspension system as claimed in claim 1, in which the object being suspended includes a body of magnetically permeable material to which its permanent magnet is mounted.

11. A magnetic suspension system as claimed in claim 1, in which the electromagnet comprises two or more wires which are wound around a common axis and connected in parallel.

12. A magnetic suspension system as claimed in claim 1, comprising means for applying a rotational force to said object.

13. A magnetic suspension system as claimed in claim 12, in which the object is arranged to rotate about a vertical axis.

14. A magnetic suspension system as claimed in claim 13, in which the overall magnetic force developed between the object and the support structure varies as the object rotates about said axis.

15. A magnetic suspension system as claimed in claim 13, in which the magnetic field radiated by the object and/or the support structure is non-uniform around a circle which is disposed co-axially with said axis of rotation.

16. A magnetic suspension system as claimed in claim 13, in which the support structure and the object each comprise a magnet or a magnetic member disposed at a point radially outwardly of said axis of rotation, so that the magnetic force developed between the object and the support structure varies according to the alignment of the magnet or magnetic member on the object with the magnet or magnetic member on the support structure.

17. A magnetic suspension system as claimed in claim 16, in which the magnetic member on the object and/or support structure becomes magnetised by an adjacent magnetic field.

18. A magnetic suspension system as claimed in claim 16, in which the magnet or magnetic member on the support structure is arranged to repel the magnet or magnetic member on the object.

19. A magnetic suspension system as claimed in claim 13, in which the detector means is mounted in a fixed position to the support structure, at a position which is located radially outwardly of said axis of rotation.

\* \* \* \* \*